US009286132B2

(12) United States Patent
Garza et al.

(10) Patent No.: US 9,286,132 B2
(45) Date of Patent: *Mar. 15, 2016

(54) UTILIZING MULTIPLE MEMORY POOLS DURING MOBILITY OPERATIONS

(71) Applicant: International Business Machines Corporation, Armonk, NY (US)

(72) Inventors: Maria D. Garza, Round Rock, TX (US); Neal R. Marion, Georgetown, TX (US); Nathaniel S. Tomsic, Austin, TX (US); Vasu Vallabhaneni, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 207 days.

This patent is subject to a terminal disclaimer.

(21) Appl. No.: 14/039,172

(22) Filed: Sep. 27, 2013

(65) Prior Publication Data

US 2015/0040128 A1  Feb. 5, 2015

Related U.S. Application Data

(63) Continuation of application No. 13/959,134, filed on Aug. 5, 2013.

(51) Int. Cl.
*G06F 9/46* (2006.01)
*G06F 9/50* (2006.01)
*G06F 9/455* (2006.01)

(52) U.S. Cl.
CPC .......... *G06F 9/5077* (2013.01); *G06F 9/45558* (2013.01); *G06F 2009/4557* (2013.01)

(58) Field of Classification Search
None
See application file for complete search history.

(56) References Cited

U.S. PATENT DOCUMENTS

| 7,756,888 | B2 | 7/2010 | Johnson et al. |
| 7,882,326 | B2 | 2/2011 | Armstrong et al. |
| 7,984,262 | B2 | 7/2011 | Battista et al. |
| 8,171,236 | B2 * | 5/2012 | Jacobs et al. ................. 711/153 |
| 2004/0190537 | A1 * | 9/2004 | Ferguson et al. ............. 370/412 |
| 2005/0080874 | A1 * | 4/2005 | Fujiwara et al. ............. 709/217 |
| 2005/0097384 | A1 * | 5/2005 | Uehara et al. .................... 714/1 |

(Continued)

OTHER PUBLICATIONS

PCT Notification of Transmittal of the International Search Report and the Written Opinion of the International Searching Authority, or the Declaration (PCT/ISA/220), the International Search Report (PCT/ISA/210) and the Written Opinion of the International Searching Authority (PCT/ISA/237), International Application No. PCT/JP2014/003293 dated Sep. 22, 2014, 7 pages.

(Continued)

*Primary Examiner* — Adam Lee
(74) *Attorney, Agent, or Firm* — Stephen R. Tkacs; Stephen J. Walder, Jr.; Thomas E. Tyson

(57) ABSTRACT

A mechanism is provided in a data processing system for performing a logical partition migration utilizing multiple paths. Responsive to a virtual machine monitor initiating a logical partition migration operation to move a logical partition from a source system to a destination system, the mechanism allocates a plurality of memory pools and a plurality of threads from a mover service partition to the virtual machine monitor. The virtual machine monitor performs the logical partition migration operation utilizing each of the plurality of threads to transfer a corresponding one of the plurality of memory pools from the source system to the destination system to effect the logical partition migration operation.

10 Claims, 4 Drawing Sheets

(56) References Cited

U.S. PATENT DOCUMENTS

| | | | |
|---|---|---|---|
| 2006/0206891 | A1 | 9/2006 | Armstrong et al. |
| 2007/0079176 | A1 | 4/2007 | Armstrong et al. |
| 2008/0222700 | A1* | 9/2008 | Goldberg et al. ............ 726/3 |
| 2008/0256501 | A1* | 10/2008 | Armstrong et al. ........... 716/7 |
| 2008/0256530 | A1* | 10/2008 | Armstrong et al. ........... 717/174 |
| 2009/0055830 | A1 | 2/2009 | Gusler et al. |
| 2009/0083575 | A1 | 3/2009 | Armstrong et al. |
| 2009/0182970 | A1 | 7/2009 | Battista et al. |
| 2009/0217283 | A1 | 8/2009 | Anand et al. |
| 2009/0282300 | A1* | 11/2009 | Heyrman et al. ........... 714/708 |
| 2009/0307447 | A1* | 12/2009 | Jacobs et al. .............. 711/162 |
| 2009/0307538 | A1* | 12/2009 | Hernandez et al. ........ 714/54 |
| 2009/0307688 | A1* | 12/2009 | Pafumi et al. ............. 718/1 |
| 2009/0313401 | A1 | 12/2009 | Mani et al. |
| 2010/0122124 | A1* | 5/2010 | Chen et al. ................ 714/57 |
| 2010/0122249 | A1* | 5/2010 | Anderson et al. ........... 718/1 |
| 2010/0161559 | A1* | 6/2010 | Patil et al. ................ 707/647 |
| 2010/0183009 | A1* | 7/2010 | Baratakke et al. ........... 370/392 |
| 2010/0229181 | A1* | 9/2010 | Ahuja et al. ............... 718/107 |
| 2011/0125979 | A1 | 5/2011 | Kancharla et al. |
| 2012/0066389 | A1* | 3/2012 | Hegde et al. ............. 709/226 |
| 2012/0198202 | A1 | 8/2012 | Arndt et al. |
| 2012/0303594 | A1 | 11/2012 | Mcwhinney et al. |
| 2013/0024718 | A1 | 1/2013 | Mewhinney et al. |
| 2013/0031341 | A1 | 1/2013 | Ganti et al. |
| 2014/0372723 | A1* | 12/2014 | Bobroff et al. ............. 711/170 |
| 2015/0040128 | A1* | 2/2015 | Garza et al. .............. 718/1 |
| 2015/0046589 | A1* | 2/2015 | Garza et al. .............. 709/226 |

OTHER PUBLICATIONS

U.S. Appl. No. 13/938,856.
U.S. Appl. No. 13/959,134.
U.S. Appl. No. 13/959,822.
U.S. Appl. No. 14/039,436.
"IBM PowerVM Virtualization Introduction and Configuration", IBM Corporation, ibm.com/redbooks, Nov. 2012, 822 pages.
"Power Systems Logical Partitioning", IBM Corporation, http://pic.dhe.ibm.com/infocenter/powersys/v3r1m5/topic/iphat/iphat.pdf, 246 pages, 2007.
"Veritas Storage Foundation and High Availability Solutions Virtualization Guide", Symantec Corporation, Feb. 2012, 110 pages.
Armstrong, W.J. et al,, "IBM POWER6 Partition Mobility: Moving Virtual Servers Seamlessly Between Physical Systems", IBM Journal of Research and Development, vol. 51, No. 6, pp. 757-762, Nov. 2007.
Attanasio, C.R. , "Virtual Control Storage—security measures in VM/370", IBM Syst J, vol. 18 No. 1, 1979, pp. 93-110.
Bailey, John E. et al., "IBM PowerVM Live Partition Mobility", http://www.redbooks.ibm.com/redbooks/pdfs/sg247460.pdf, Mar. 2009, 312 pages.
Bamiah, Mervat A. et al., "Using Virtual Machine Monitors to Overcome the Challenges of Monitoring and Managing Virtuaiized Cloud Infrastructures", Proceedings of the SPIE—The International Society for Optical Engineering, vol. 8349, 2011, 5 pages.
Brito, Allyson et al., "IBM PowerVM Virtualization Active Memory Sharing", IBM Corporation, ibm.com/redbooks, Jun. 2011, 122 pages.
Clark, Christopher et al., "Live Migration of Virtual Machines", USENIX Association NSDI '05: 2nd Symposium on Networked Systems Design & Implementation, May 2-4, 2005, pp. 273-286.
Elmore, Aaron J. et al., "Zephyr: Live Migration in Shared Nothing Databases for Elastic Cloud Platforms", SIGMOD '11, Jun. 12-16, 2011, Athens, Greece, 12 pages.
Liu, Haikun et al., "Live Migration of Virtual Machine Based on Full System Trace and Replay", HPDC '09, Jun. 11-13, 2009, Munich, Germany, 10 pages.
Murphy, Richard C. , "Design Parameters for Distributed PIM Memory Systems", Department of Computer Science and Engineering, Notre Dame, Indiana, Apr. 2000, 220 pages.
"IBM Power Systems Live Partition Mobility", IBM Corporation 2007, 2009, 128 pages.

* cited by examiner

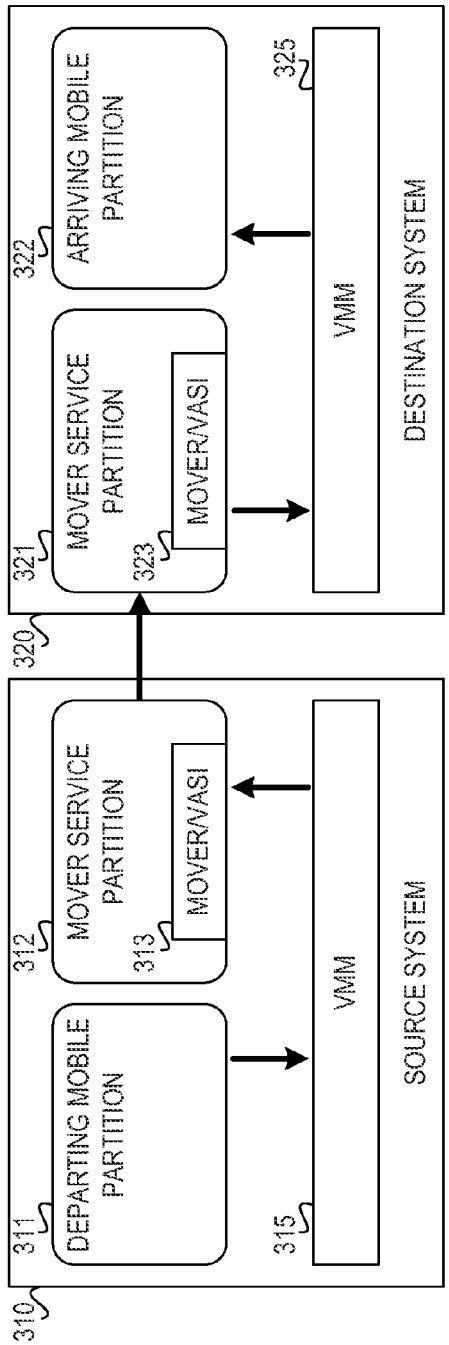
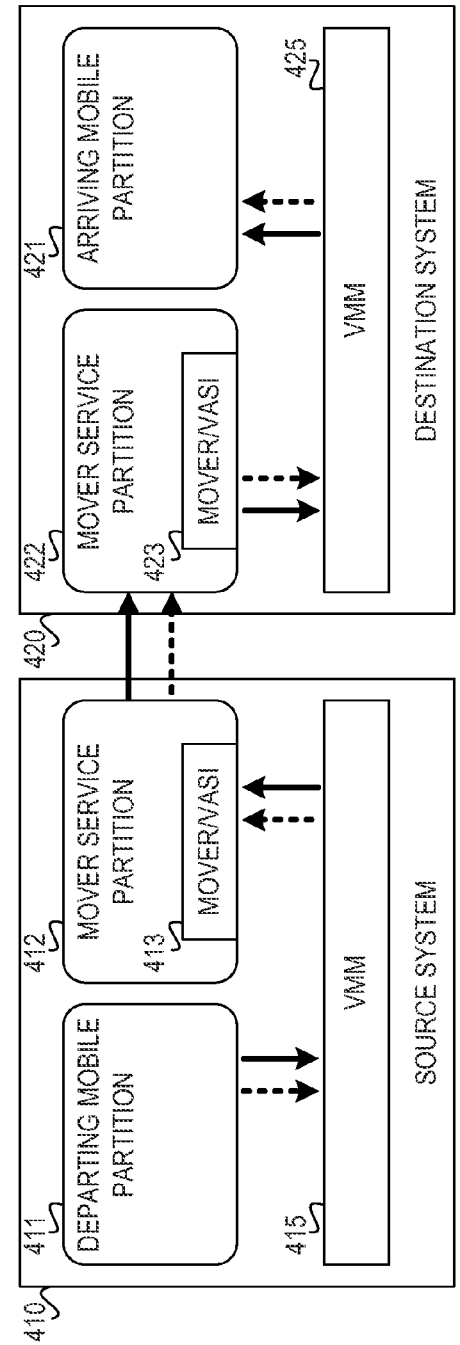

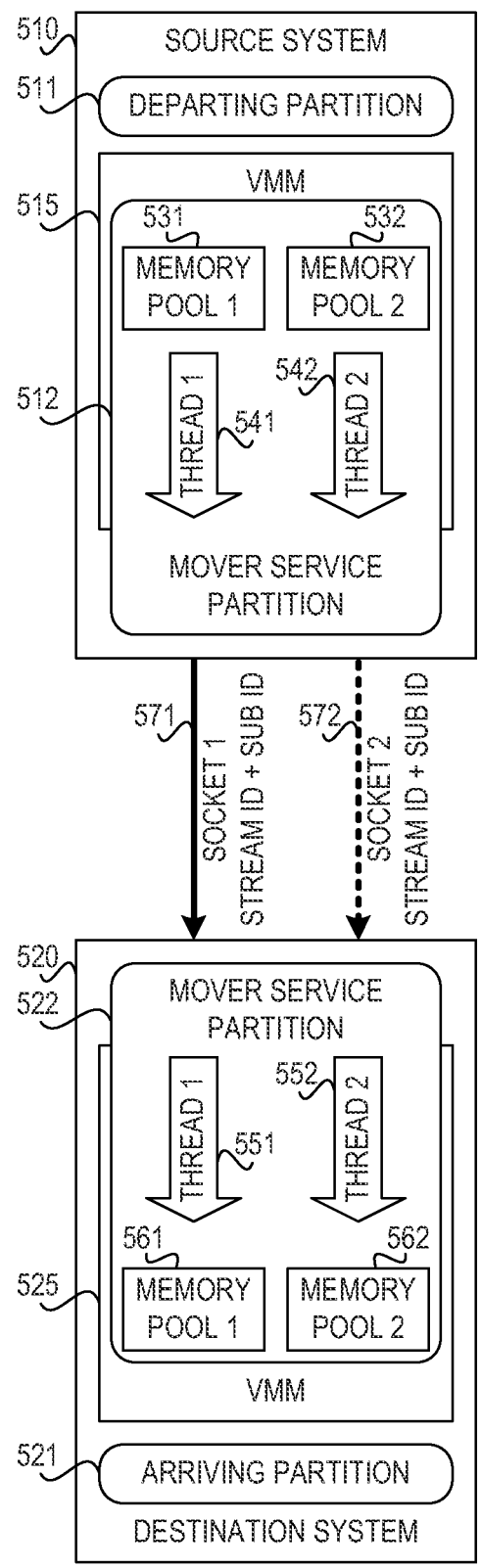

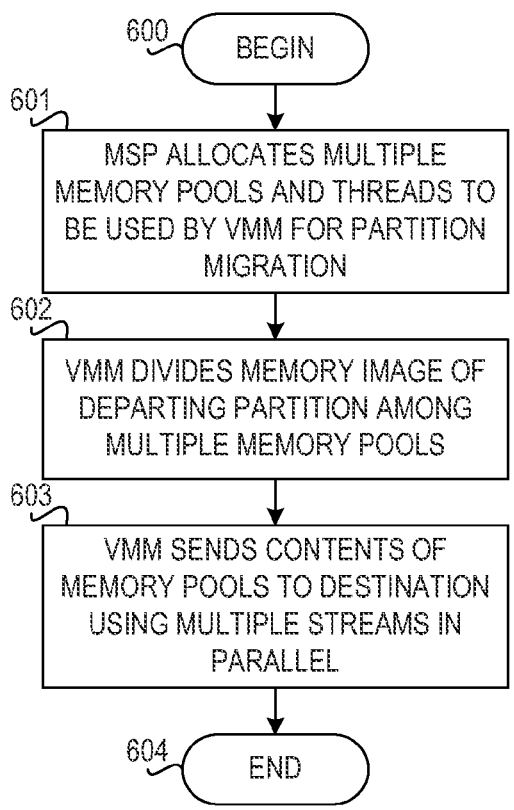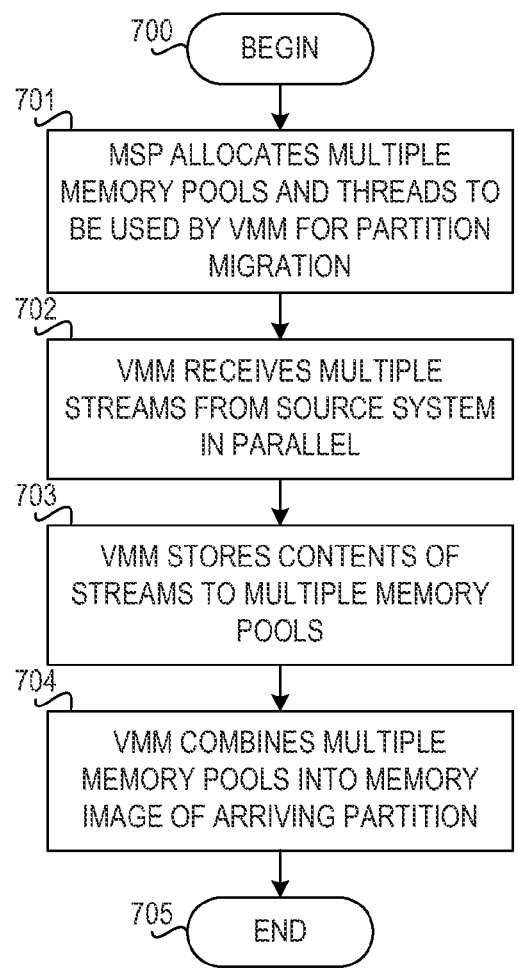

US 9,286,132 B2

UTILIZING MULTIPLE MEMORY POOLS DURING MOBILITY OPERATIONS

BACKGROUND

The present application relates generally to an improved data processing apparatus and method and more specifically to mechanisms for utilizing multiple memory pools during mobility operations to enhance performance and better utilize system resources.

Live Partition Mobility (LPM) is a feature of POWER6® and POWER7® servers that allows a running logical partition (LPAR) to be relocated from one system to another. POWER6 and POWER7 are trademarks of International Business Machines Corporation in the United States and other countries. The source and target systems must have access to the same network and storage area networks (SANs) but need not be of the same type. Partitions that are to be relocated must be fully virtualized (i.e., have no dedicated input/output (I/O) adapters) although it is possible to use multi-pathing software to fail over to virtual adapters for the duration of the move.

Any sized partition can be moved; essentially, memory is copied asynchronously from one system to another to create a clone of a running partition, with "dirty" pages being re-copied as necessary. When a threshold is reached (i.e., when a high percentage of the pages have been successfully copied across), the partition is transitioned to the target machine and any remaining pages are copied across synchronously. The agents that carry out the memory copying are nominated Virtual I/O Servers (VIOS) on each machine. LPM is used to avoid outages for planned server maintenance, for load balancing across multiple servers and for energy conservation.

SUMMARY

In one illustrative embodiment, a method, in a data processing system, is provided comprising responsive to a virtual machine monitor initiating a logical partition migration operation to move a logical partition from a source system to a destination system, allocating a plurality of memory pools and a plurality of threads from a mover service partition to the virtual machine monitor. The method further comprises performing, by the virtual machine monitor, the logical partition migration operation. The virtual machine monitor uses each of the plurality of threads to transfer a corresponding one of the plurality of memory pools from the source system to the destination system to effect the logical partition migration operation.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 3 is a block diagram illustrating partition migration with single memory pool utilization in accordance with an embodiment;

FIG. 4 is a block diagram illustrating partition migration with multiple memory pool and multiple thread allocation in accordance with an illustrative embodiment;

FIG. 5 is a block diagram illustrating partition migration utilizing multiple paths in accordance with an illustrative embodiment;

FIG. 6 is a flowchart illustrating operation of a source system performing a partition migration operation utilizing multiple paths in accordance with an illustrative embodiment; and FIG. 7 is a flowchart illustrating operation of a destination system performing a partition migration operation utilizing multiple paths in accordance with an illustrative embodiment.

DETAILED DESCRIPTION

Figure 1:
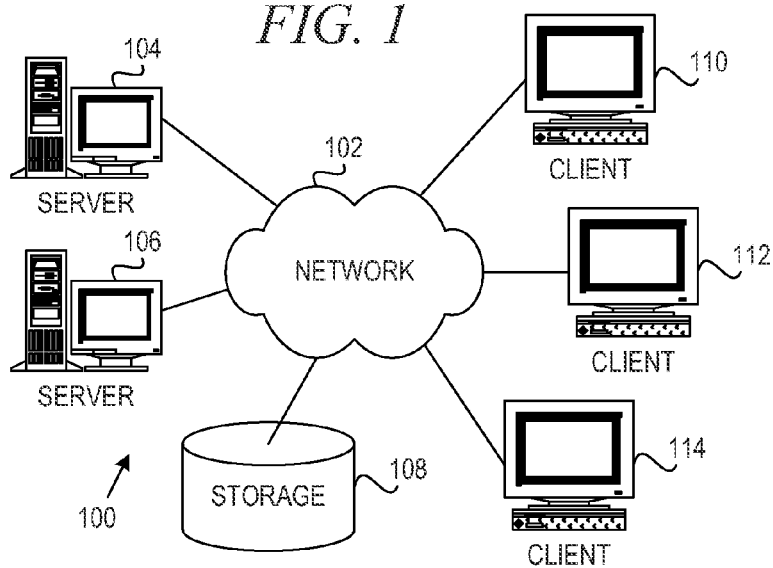
FIG. 1 depicts a pictorial representation of an example distributed data processing system in which aspects of the illustrative embodiments may be implemented.

The illustrative embodiments provide a mechanism to utilize multiple memory pools during mobility operations to enhance performance and better utilize system resources. Live Partition Mobility (LPM) provides the ability to move a running partition with its operating system (OS) and applications from one physical server (i.e., a computer electronic complex (CEC)) to another without disrupting the operation of that partition. A Virtual Asynchronous Services Interface (VASI) virtual device and mover kernel extension on a Virtual I/O Server (VI/OS) partition provides the function or transporting the partition state from one system to another. A VI/OS configured to utilize this functionality is considered a mover service partition (MSP).

The POWER® Hypervisor (PHYP) is a thin firmware level that has knowledge of the client partition's state, including the client partition's memory. A hypervisor is a type of virtual machine monitor (VMM) of a data processing system that creates, runs, and manages virtual machines (logical partitions). A hypervisor or VMM also performs virtualization of resources allocated to logical partitions and performs other functions for running and managing logical partitions. While example embodiments described herein may refer to a PHYP, or more generally to a hypervisor, the aspects of the invention apply to any form of virtualization component or VMM.

During an active migration, a PHYP uses a single memory pool per mobility operation to send client memory on the source system to the destination system, and a PHYP uses a single memory pool per mobility operation to receive client memory on the destination system. This process of sending and receive memory buffers from and to the PHYP is currently single threaded. All buffers must be sent and received in the correct order one at a time. The drawback of this method is that it underutilizes system resources and network bandwidth.

The illustrative embodiments provide mechanisms for the PHYP to split the process into separate threads, each operating on a different memory pool, to increase mobility performance and better utilize system resources. The illustrative embodiments create multiple paths to and from the PHYP. By removing the PHYP requirement that memory pages be sent in order, the illustrative embodiments can be set up to utilize multiple threads each connecting to a different socket thereby creating independent parallel paths operating on their own separate memory pools, thus significantly increasing LPM performance.

The mechanisms of the illustrative embodiments reduce the amount of time a live mobility operation runs, and these mechanisms provide a method to reduce the amount of VI/OS resources necessary for a mobility operation, which has advantages that allow for overall system utilization and possible cost savings. The mechanisms of the illustrative embodiments reduce the impact that mobility operations have on non-migrating clients being serviced by the VI/OS.

The above aspects and advantages of the illustrative embodiments of the present invention will be described in greater detail hereafter with reference to the accompanying figures. It should be appreciated that the figures are only intended to be illustrative of exemplary embodiments of the present invention. The present invention may encompass aspects, embodiments, and modifications to the depicted exemplary embodiments not explicitly shown in the figures but would be readily apparent to those of ordinary skill in the art in view of the present description of the illustrative embodiments.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be a system, apparatus, or device of an electronic, magnetic, optical, electromagnetic, or semiconductor nature, any suitable combination of the foregoing, or equivalents thereof. More specific examples (a non-exhaustive list) of the computer readable storage medium would include the following: an electrical device having a storage capability, a portable computer diskette, a hard disk, a random access memory (RAM), a read-only memory (ROM), an erasable programmable read-only memory (EPROM or Flash memory), an optical fiber based device, a portable compact disc read-only memory (CDROM), an optical storage device, a magnetic storage device, or any suitable combination of the foregoing. In the context of this document, a computer readable storage medium may be any tangible medium that can contain or store a program for use by, or in connection with, an instruction execution system, apparatus, or device.

In some illustrative embodiments, the computer readable medium is a non-transitory computer readable medium. A non-transitory computer readable medium is any medium that is not a disembodied signal or propagation wave, i.e. pure signal or propagation wave per se. A non-transitory computer readable medium may utilize signals and propagation waves, but is not the signal or propagation wave itself. Thus, for example, various forms of memory devices, and other types of systems, devices, or apparatus, that utilize signals in any way, such as, for example, to maintain their state, may be considered to be non-transitory computer readable media within the scope of the present description.

A computer readable signal medium, on the other hand, may include a propagated data signal with computer readable program code embodied therein, for example, in a baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Similarly, a computer readable storage medium is any computer readable medium that is not a computer readable signal medium.

Computer code embodied on a computer readable medium may be transmitted using any appropriate medium, including but not limited to wireless, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular mariner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
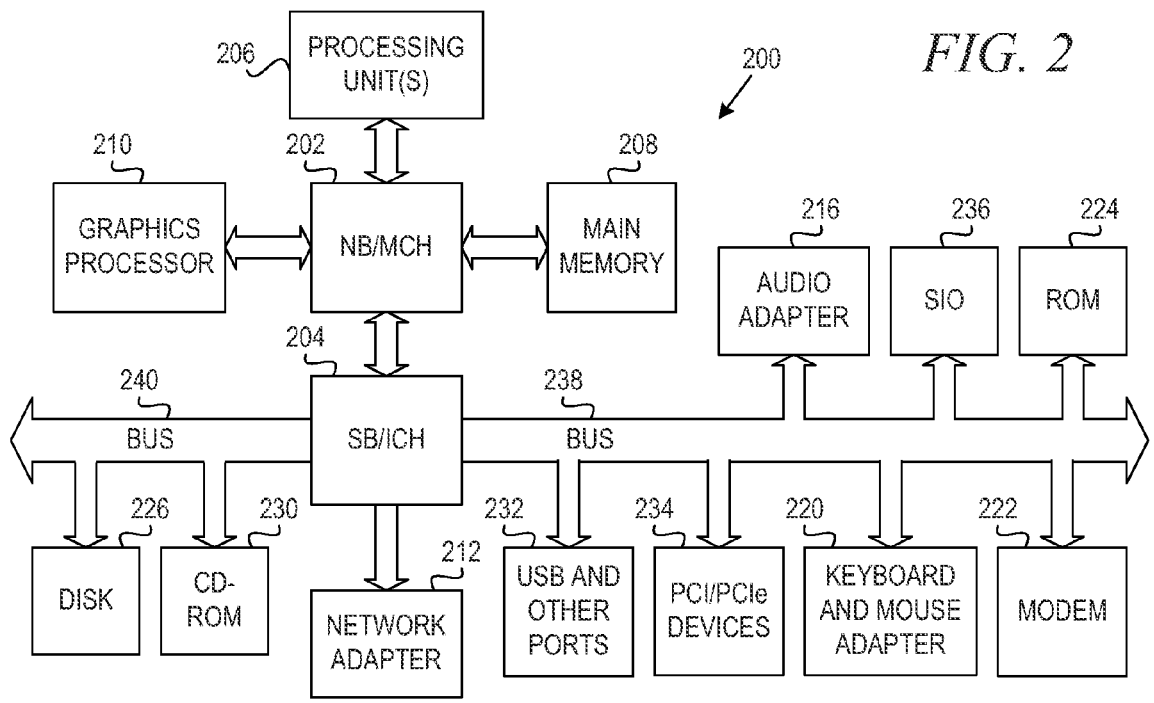
FIG. 2 is a block diagram of an example data processing system in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and inputoutput (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic inputoutput system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System p® computer system, running the Advanced Interactive Executive (AIX®) operating system or the LINUX® operating system. Data processing system 200 may be a symmetric multiprocessor (SMP)

system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

FIG. 3 is a block diagram illustrating partition migration with single memory pool utilization in accordance with an embodiment. Departing mobile partition 311 is being migrated from source system 310 to destination system 320. In the partition migration operation, virtual machine monitor (VMM) 315 provides support to transfer state and memory image of departing mobile partition 311 from mover service partition (MSP) 312 in source system 310 to MSP 321 in destination system 320. VMM 325 provides support to receive state and memory image of arriving mobile partition 322 using MSP 321 in destination system 320.

MSP 312 includes a mover/VASI device driver 313, and MSP 321 includes mover/VASI device driver 323. Mover/VASI device driver 313 allocates a thread and a memory pool to VMM 315, and mover/VASI device driver 323 allocates a thread and a memory pool to VMM 325 to perform the partition migration operation. VMM 315 sends and tracks the client partition's memory and can potentially resend dirty pages as the client partition continues to run during nearly all of the mobility operation.

The client's memory image can be quite large, especially in clients running databases. In addition, with the current rate of adoption of the LPM functionality, there is a continued push to move towards supporting a higher number of concurrent mobility operations. However, the process of sending and receiving client memory images using a single thread and a single memory pool underutilizes system resources and network bandwidth.

FIG. 4 is a block diagram illustrating partition migration with multiple memory pool and multiple thread allocation in accordance with an illustrative embodiment. Departing mobile partition 411 is being migrated from source system 410 to destination system 420. In the partition migration operation, VMM 415 provides support to transfer state and memory image of departing mobile partition 411 from mover service partition (MSP) 412 in source system 410 to MSP 422 in destination system 420. VMM 425 provides support to receive state and memory image of arriving mobile partition 421 using MSP 422 in destination system 420.

MSP 412 includes a mover/VASI device driver 413, and MSP 422 includes mover/VASI device driver 423. Mover/VASI device driver 413 allocates a thread and a memory pool to VMM 415, and mover/VASI device driver 423 allocates a thread and a memory pool to VMM 425 to perform the partition migration operation. VMM 415 sends and tracks the client partition's memory and can potentially resend dirty pages as the client partition continues to run during nearly all of the mobility operation.

In accordance with the illustrative embodiment, MSP 412 allocates multiple memory pools and multiple threads to VMM 415, and MSP 422 allocates multiple memory pools and multiple threads to VMM 425. VMM 415, 425 uses multiple pools and threads per MSP pairs for a single mobility operation so that the memory of departing partition 411 can be divided among the number of available pairs, thus potentially increasing bandwidth exponentially. Splitting the memory into multiple pools can be implemented without any changes to the LPM orchestrator, such as the hardware management console (HMC) (not shown), because the data of the mobility operation is tracked by a single stream identifier (ID). Each thread allocated by MSP 412 to VMM 415 and by MSP 422 to VMM 425 adds a sub-ID to its stream to be identified between MSPs 412, 422 and between VMMs 415, 425. The HMC only knows there is a single migration and does not know there are multiple memory pools, threads, or sockets.

FIG. 5 is a block diagram illustrating partition migration utilizing multiple paths in accordance with an illustrative embodiment. A departing mobile partition (not shown) is being migrated from source system 510 to destination system 520. In the partition migration operation, VMM 515 provides support to transfer state and memory image of departing mobile partition 511 from mover service partition (MSP) 512 in source system 510 to MSP 522 in destination system 520. VMM 525 provides support to receive state and memory image of arriving mobile partition 521 using MSP 522 in destination system 520.

In accordance with the illustrative embodiment, MSP 512 allocates multiple memory pools 531, 532 and multiple threads 541, 542 to VMM 515 for the partition migration operation. As part of the mobile operation, MSP 522 allocates multiple memory pools 561, 562 and multiple threads 551, 552 to VMM 525 for the partition migration operation. VMM 515 divides the memory image of departing mobile partition 511 into memory pools 531, 532. VMM 515 segments each memory pool 531, 532 into buffers. VMM 515 removes ordering between memory pools 531, 532, but maintains ordering within each memory pool 531, 532. In one embodiment, VMM 515 does not split memory pages, resulting in buffers within memory pools 531, 532 being partially filled.

Thread 1 541 sends contents of memory pool 1 531 to MSP 522 on destination system 520 via socket 1 571. In parallel, thread 2 542 sends contents of memory pool 2 532 to MSP 522 destination system 520 via socket 2 572. Sockets 571, 572 use a stream ID for the partition migration operation. Thread 1 541 adds a sub ID to socket 1 571, and thread 2 542 adds a different sub ID to socket 2 572. As far as the hardware management console (HMC) is concerned, there is one partition migration with a single stream ID.

Thread 1 551 receives contents for arriving partition 521 via socket 1 571 and stores the contents in memory pool 1 561. In parallel thread 552 receives contents for arriving partition 521 via socket 2 572 and stores the contents in memory pool 2 562. Each memory pool 561, 562 arrives in order. VMM 525 combines memory pool 1 561 and memory pool 2 562, keeping the original order of the memory pages of the memory image of departing partition 511, to form the memory image of arriving partition 521.

While the depicted example in FIG. 5 shows two memory pools and two threads, any number of memory pools and threads may be used depending upon available system resources, desired performance, and other considerations. For example, when an administrator anticipates a high number of partition migrations, the administrator may allocate additional system resources to the mobile service partitions to be available for allocation to the VMM for partition migration operations. Allocating additional system resources for partition migration reduces the amount of time needed for the partition migration operation, leaving less time for the mobile partition to dirty pages and ultimately reducing the amount of VIOS (MSP) resources necessary for the mobility operation.

FIG. 6 is a flowchart illustrating operation of a source system performing a partition migration operation utilizing multiple paths in accordance with an illustrative embodiment. Operation begins (block 600), and the mover service partition (MSP) allocates multiple memory pools and multiple threads to be used by the virtual machine manager (VMM) for a partition migration operation (block 601). The VMM divides the memory image of the departing partition among the multiple memory pools (block 602). The VMM segments each memory pool into buffers. The VMM removes ordering between the memory pools but maintains ordering within each memory pool. In one embodiment, the VMM does not split memory pages, resulting in buffers within the memory pools being partially filled.

The VMM then sends contents of the memory pools to the destination system using multiple streams in parallel (block 603). Each thread sends the contents of a corresponding memory pool to the MSP of the destination system via an individual socket. The sockets use a stream ID for the partition migration operation. Each thread adds a unique sub ID to its corresponding socket. As far as the hardware management console (HMC) is concerned, there is one partition migration with a single stream ID. Thereafter, operation ends (block 604).

FIG. 7 is a flowchart illustrating operation of a destination system performing a partition migration operation utilizing multiple paths in accordance with an illustrative embodiment. Operation begins (block 700), and the MSP allocates multiple memory pools and multiple threads to be used by the VMM for partition migration (block 701). The VMM receives multiple streams from the source system in parallel via the multiple threads (block 702).

The VMM receives each stream in order and stores the contents into the multiple memory pools (block 703). Each thread receives a corresponding stream via an individual socket and stores the contents in a corresponding memory pool. Then, the VMM combines the multiple memory pools to form the memory image of the arriving partition (block 704). Thereafter, operation ends (block 704).

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system comprising:
responsive to a virtual machine monitor initiating a logical partition migration operation to move a logical partition from a source system to a destination system, allocating a plurality of memory pools and a plurality of threads from a mover service partition to the virtual machine monitor; and
performing, by the virtual machine monitor, the logical partition migration operation, wherein the virtual machine monitor uses each of the plurality of threads to transfer one of the plurality of memory pools from the source system to the destination system.

2. The method of claim 1, wherein the virtual machine monitor executes in the source system, wherein performing the logical partition migration operation comprises splitting a memory image of the logical partition among the plurality of memory pools.

3. The method of claim 2, wherein the virtual machine monitor segments each memory pool into a plurality of buffers and assigns whole memory pages to the plurality of buffers in memory page order within each memory pool.

4. The method of claim 2, wherein the virtual machine monitor transfers each memory pool in memory page order.

5. The method of claim 2, wherein the virtual machine monitor transfers the plurality of memory pools in parallel.

6. The method of claim 2, wherein each of the plurality of threads transfers a corresponding one of the plurality of memory pools via a respective socket, wherein the logical partition migration operation uses a stream identifier to identify the logical partition migration operation, wherein each of the plurality of threads adds a sub identifier to the stream identifier to form a modified stream identifier, and wherein each respective socket uses the modified stream identifier to identify the respective socket.

7. The method of claim 1, wherein the virtual machine monitor executes in the destination system, the method further comprising combining the plurality of memory pools to form a memory image of the logical partition at the destination system.

8. The method of claim 7, wherein each of the plurality of threads receives a stream via a respective socket and stores the stream in one of the plurality of memory pools.

9. The method of claim 8, wherein the logical partition migration operation uses a stream identifier to identify the logical partition migration operation and wherein each respective socket uses the stream identifier and a corresponding sub identifier to identify the respective socket.

10. The method of claim 8, wherein the plurality of threads receive and store the plurality of memory pools in parallel.

* * * * *